US008443561B2

(12) United States Patent  
Ceccotti et al.

(10) Patent No.: US 8,443,561 B2
(45) Date of Patent: May 21, 2013

(54) CONNECTING ELEMENT FOR PANELS

(75) Inventors: Ario Ceccotti, Vaglia (IT); Paolo Galletti, Calcinaia (IT); Daniele Maltinti, Cascina (IT)

(73) Assignees: Trentino Sviluppo S.p.A., Rovereto (IT); CNR Consiglio Nazionale Delle Richerche, Rome (IT)

( * ) Notice: Subject to any disclaimer, the term of this patent is extended or adjusted under 35 U.S.C. 154(b) by 204 days.

(21) Appl. No.: 12/864,017

(22) PCT Filed: Jan. 23, 2008

(86) PCT No.: PCT/IT2008/000036
§ 371 (c)(1),
(2), (4) Date: Jul. 22, 2010

(87) PCT Pub. No.: WO2009/093273
PCT Pub. Date: Jul. 30, 2009

(65) Prior Publication Data
US 2010/0293884 A1    Nov. 25, 2010

(51) Int. Cl.
*E04B 1/38* (2006.01)
*E04B 1/26* (2006.01)

(52) U.S. Cl.
USPC .......... 52/285.2; 52/582.1; 52/586.2; 52/715; 403/199

(58) Field of Classification Search
USPC ............ 52/582.1, 586.1, 586.2, 655.1, 285.3, 52/712, 715, 285.1, 285.2, 285.4; 248/300, 248/346.01, 346.03; 403/315–319, 187, 188, 403/198, 199, 230
See application file for complete search history.

(56) References Cited

U.S. PATENT DOCUMENTS

| 844,459 A | * | 2/1907 | McCausland ................ 293/1 |
| 1,538,619 A | * | 5/1925 | Burrell ........................ 404/50 |
| 2,092,751 A | * | 9/1937 | Davis ........................... 52/513 |
| 2,420,425 A | * | 5/1947 | Hardwick ................... 206/320 |
| 2,447,694 A | * | 8/1948 | Finch ....................... 52/506.09 |
| 2,627,616 A | * | 2/1953 | Lasting ......................... 5/296 |
| 2,787,902 A | * | 4/1957 | Primus ........................ 52/314 |
| 3,816,011 A | * | 6/1974 | Biebuyck et al. ............ 403/187 |
| 4,068,332 A | * | 1/1978 | Ball et al. ..................... 5/296 |
| 4,503,652 A | * | 3/1985 | Turner ........................ 52/657 |
| 4,619,089 A | * | 10/1986 | Stein .......................... 52/233 |
| 4,650,425 A |   | 3/1987 | McGarry |
| 4,835,916 A | * | 6/1989 | Steadman ..................... 52/28 |
| 5,062,733 A | * | 11/1991 | Cholid et al. ............... 403/189 |
| 5,230,198 A |   | 7/1993 | Callies |
| 5,438,811 A | * | 8/1995 | Goya .......................... 52/702 |
| 5,557,856 A | * | 9/1996 | Kerttula ...................... 34/117 |

(Continued)

FOREIGN PATENT DOCUMENTS

DE    819 146 C    10/1951
EP    0 305 100 A1    3/1989

(Continued)

*Primary Examiner* — Robert Canfield
(74) *Attorney, Agent, or Firm* — Pearne & Gordon LLP

(57) ABSTRACT

A connecting element for panels comprises at least one plate (2) which can be fixed to a first panel (3), a connecting body (4) connected to the plate (2) and which can be inserted in a cavity (6) in a second panel (5) to connect the second panel to the first panel (3); the connecting body (4) having a substantially 'V'-shaped cross-section and having a top edge (9) which can be completely inserted in the cavity (6).

12 Claims, 3 Drawing Sheets

U.S. PATENT DOCUMENTS

| | | | | |
|---|---|---|---|---|
| 5,896,721 A | * | 4/1999 | Sugiyama | 52/712 |
| 6,032,431 A | * | 3/2000 | Sugiyama | 52/656.9 |
| 6,698,971 B1 | * | 3/2004 | Wilhelmi | 403/403 |
| 7,104,022 B2 | * | 9/2006 | Burgess | 52/702 |
| 7,325,367 B2 | * | 2/2008 | Burgess | 52/702 |
| 8,074,422 B2 | * | 12/2011 | O'Neil et al. | 52/700 |

FOREIGN PATENT DOCUMENTS

| | | |
|---|---|---|
| FR | 2 266 775 A1 | 10/1975 |
| JP | 7011708 A | 1/1995 |
| JP | 8082004 A | 3/1996 |
| WO | 96/30606 A1 | 10/1996 |

\* cited by examiner

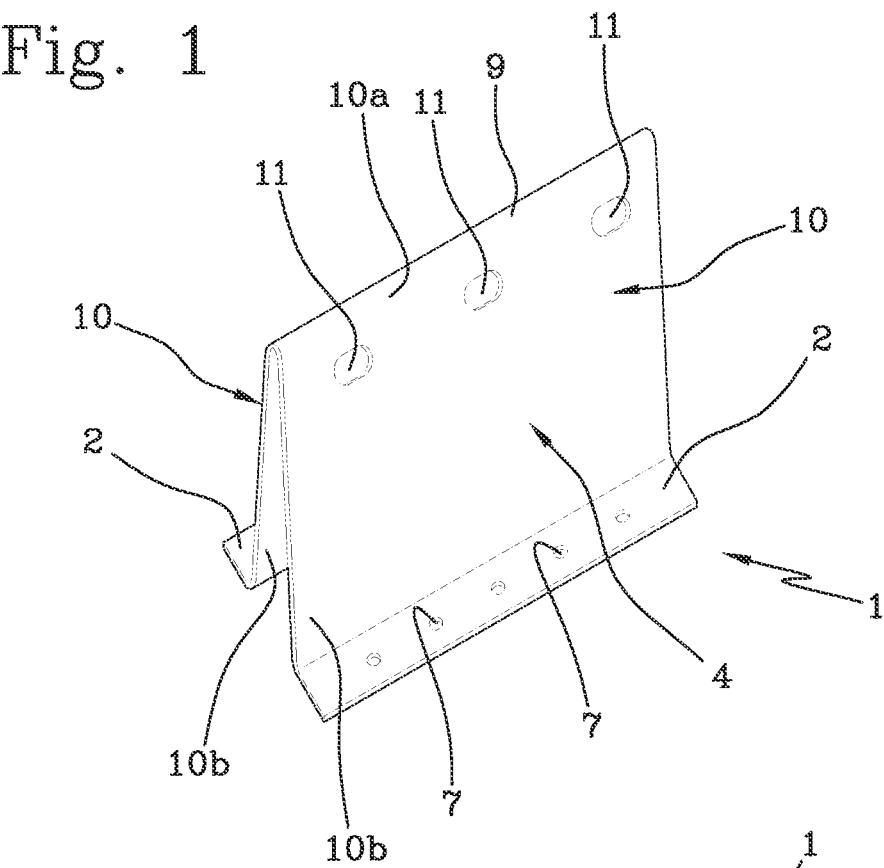
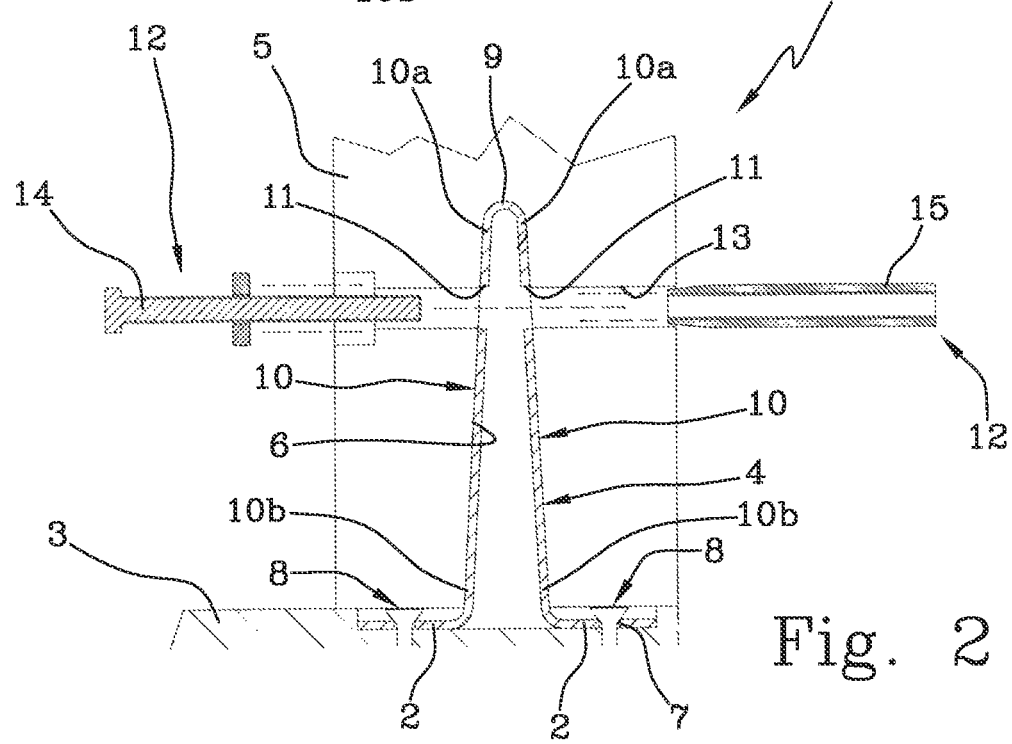

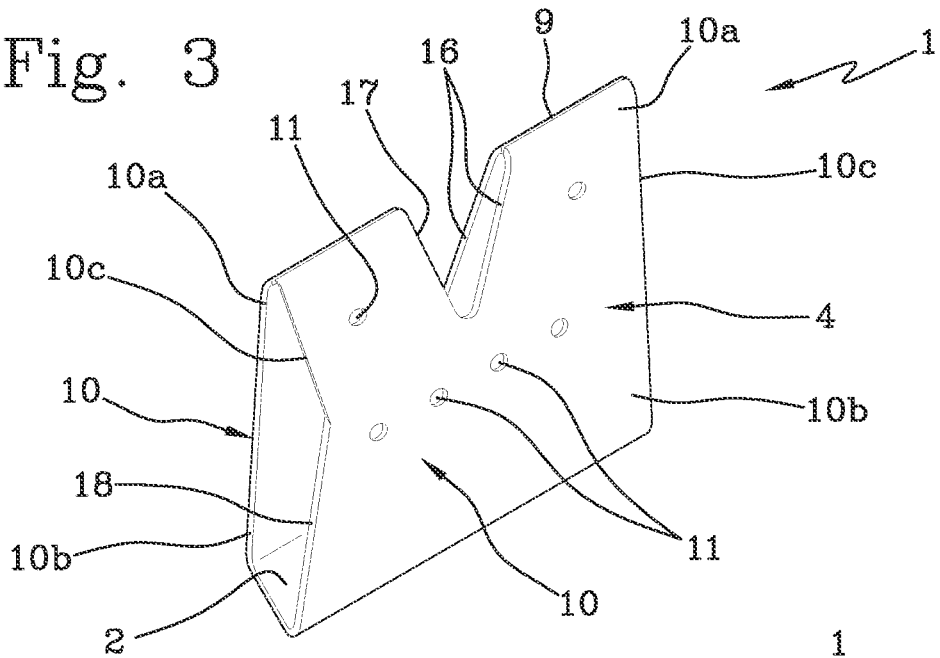
Fig. 3
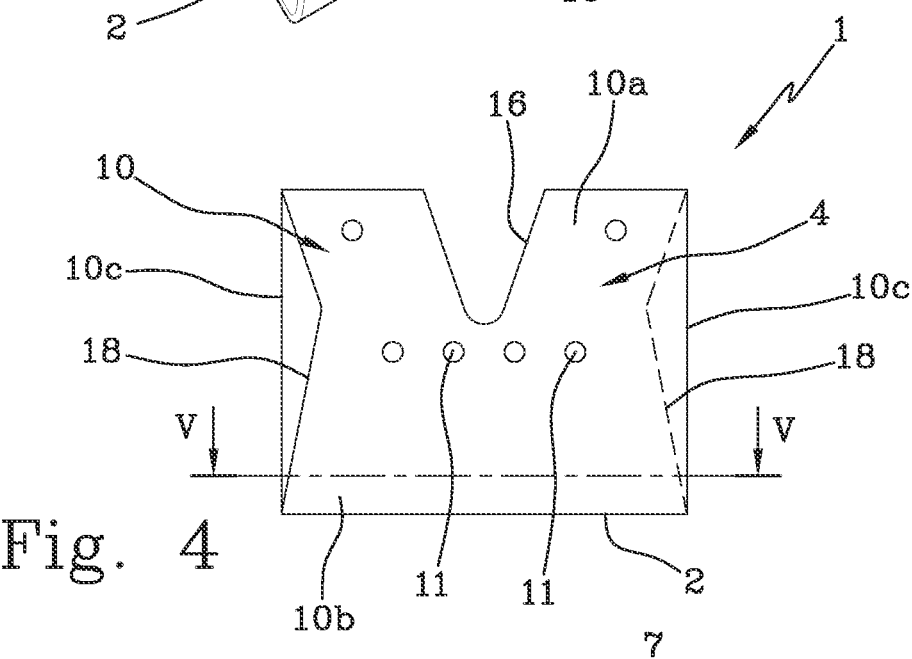
Fig. 4
Fig. 5

CONNECTING ELEMENT FOR PANELS

TECHNICAL FIELD

The present invention relates to a connecting element for panels.

In particular, the present invention is advantageously applied in the connection of wooden panels in the sector of construction of wooden buildings.

The present invention is also advantageously applied in the connection of panels made of other material, for example, panels made of multi-layer material, concrete or other material.

BACKGROUND ART

There are prior art connecting elements for panels consisting of a plate made of a metal material and bent in such a way that it forms an "L" or a "T"-shaped structure.

Such connecting elements comprise a portion for connection to a first panel and a second portion which is fixed to a second panel.

"T"-shaped connecting elements have at least one portion which can be inserted in a notch suitably made in the panel during panel construction. In this way, the panel is connected in such a way that the connecting element is at least partly hidden.

Alternatively, there are prior art connecting elements with a flat first portion and two second portions, also flat, positioned parallel with one another. In this case, once the first portion has been fixed to the first panel, the second panel is inserted in the space formed by the two parallel second portions. Suitable fixing means are used to make the connection between the second panel and the connecting element stable.

These types of connecting elements are used for panel angular connections. In other words, these elements are used to connect two panels at right angles to one another. In particular, said type of connection is used to connect a panel forming a floor and/or ceiling of a building to a panel at least partly forming a supporting wall or partition wall of the building.

Disadvantageously, the prior art connecting elements have poor structural features, in particular in terms of rigidity.

This disadvantage is particularly evident during the assembly of panels for constructing a building.

Using prior art connecting elements requires sequential mounting of the panels forming the walls on the one forming the floor and/or ceiling.

In other words, it is essential to mount a panel directly on the adjacent panel, since the prior art connecting elements cannot support isolated panels, even temporarily.

Moreover, this causes operators to use large panels so as to reduce the number of panels and facilitate fitting.

However, in doing this, problems emerge linked to panel handling, and safety problems for the operators due, for example, to the "sail effect" of large panels.

DISCLOSURE OF THE INVENTION

In this context, the technical purpose of the present invention is to propose a connecting element for panels which is free of the above-mentioned disadvantages.

In particular, the present invention has for an aim to propose a connecting element for panels which has noticeably improved structural features.

Moreover, the present invention has for an aim to propose a connecting element for panels which allows easy, rapid and safe assembly of the panels for constructing a building.

In accordance with the present invention, the technical purpose indicated and the aims specified are achieved by a connecting element for panels comprising the technical features described in one or more of the claims herein.

BRIEF DESCRIPTION OF THE DRAWINGS

Further features and advantages of the present invention are more apparent in the description below, with reference to a preferred, non-limiting, embodiment of a connecting element for panels, illustrated in the accompanying drawings, in which:

FIG. 1 is a perspective view of a first embodiment of a connecting element for panels in accordance with the present invention;

FIG. 2 is a cross-section of the connecting element for panels of FIG. 1 in an operating configuration;

FIG. 3 is a perspective view of a second embodiment of the connecting element for panels in accordance with the present invention;

FIG. 4 is an elevation view of the connecting element for panels of FIG. 3; and

FIG. 5 is a cross-section of the connecting element of FIG. 3 according to the line V-V of FIG. 4.

DETAILED DESCRIPTION OF THE PREFERRED EMBODIMENTS OF THE INVENTION

Figure 6:
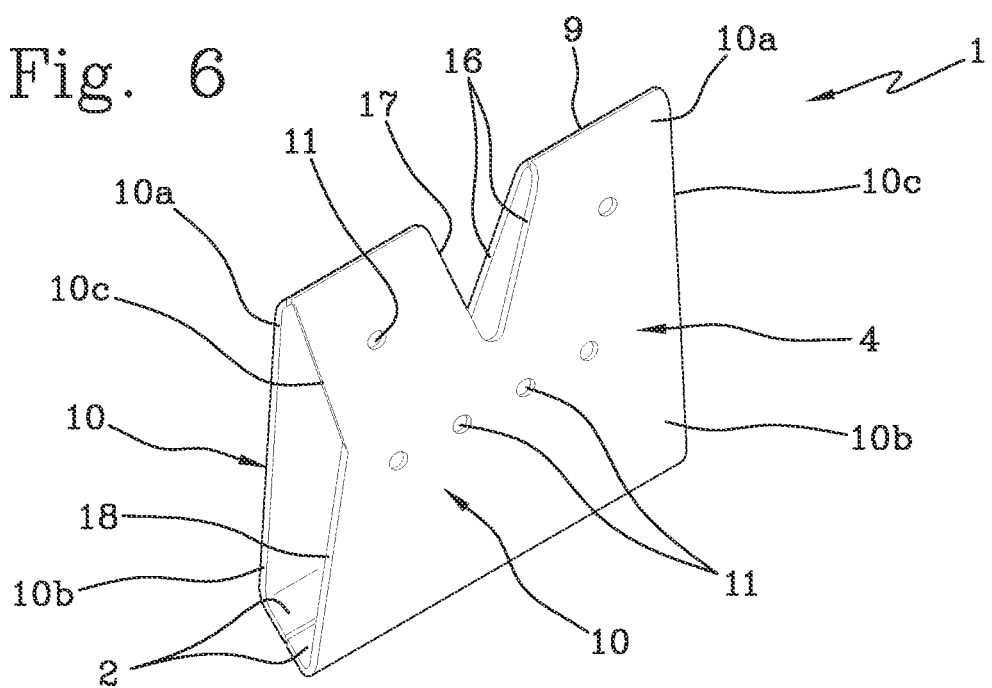
FIG. 6 is a perspective view of a third embodiment of the connecting element for panels in accordance with the present invention.

With reference to the accompanying drawings, the numeral 1 denotes as a whole a connecting element for panels.

This description refers to wooden panels. However, it shall be understood that the present invention can be advantageously applied to panels made of other materials.

The connecting element 1 comprises at least one plate 2, preferably flat, which can be fixed to a first wooden panel 3 and a connecting body 4 connected to the plate 2 and which can be inserted in a second wooden panel 5.

In particular, the connecting body 4 can be inserted in a cavity 6 shaped to match it made in the second panel 5 (FIG. 2).

Advantageously, this feature allows the centred assembly of panels. In other words, the position of the cavity 6 made in the second panel 5 carefully determines the position relative to the first panel 3.

It should be noticed that the connecting body 4 extends mainly along a direction of extension perpendicular to a plane in which the plate 2 lies.

In the embodiment illustrated in FIGS. 1 and 2, the connecting element 1 comprises two flat coplanar plates 2, each connected to the connecting body 4.

Each plate 2 has at least one hole 7 for housing an anchor element 8 needed to fix the plate 2 to the first panel 3.

In more detail, the plate 2 has a plurality of holes 7 which are substantially aligned and equidistant, in practice each housing a corresponding anchor element 8.

The anchor element 8 may, for example, be a nail, a self-tapping screw or other element.

Advantageously, the connecting body 4 has a substantially "V"-shaped cross-section and also has a top edge 9 which can be completely inserted in the cavity 6.

The connecting body 4 comprises two further plates 10, preferably flat, set at an angle to each other and converging towards the top edge 9. Each further plate 10 is connected to a respective plate 2.

The further plates 10 of the connecting body 4 have first ends 10a which are associated with one another to form the top edge 9 and which can be completely inserted in the cavity 6, and second ends 10b, opposite the first ends, connected to the plates 2.

In this embodiment, the first ends 10a of the further plates 10 are integrated with one another.

In the connecting body 4 there is at least one through-hole 11 for housing means 12 for fixing the connecting body to the second panel 5.

In particular, the connecting body 4 has a plurality of through-holes 11 for housing respective fixing means 12.

In accordance with what is shown in FIGS. 1 and 2, the plates 2 lie in such a way that they extend away from one another from the second ends 10b of the further plates 10. In an alternative embodiment (FIG. 6), the plates 2 lie in such a way that they extend towards one another so that they are below the further plates 10 of the connecting body 4.

In more detail, the through-holes 11 are made through the further plates 10 close to their first ends 10a. In other words, the through-holes 11 are made close to the top edge 9 of the connecting body 4.

In practice, and in particular with reference to FIG. 2, when the connecting body 4 is inserted in the second panel 5, the through-holes 11 made in the connecting body 4 lie in such a way that they are aligned with respective holes 13 made in the second panel 5 and across the cavity 6.

In the embodiment described, the fixing means 12 comprise a screw 14 connected to a sleeve 15, both inserted in the through-holes 11.

With reference to the embodiment illustrated in FIGS. 3, 4 and 5, the connecting element 1 comprises a single plate 2 for connection to the first panel 3.

The plate 2 is connected to the connecting body 4 in such a way that it lies opposite the top edge 9.

In more detail, the plate 2 is connected to the second ends 10b of the further plates 10 of the connecting body 4. In other words, the plate 2 lies below the further plates 10.

In this embodiment, the first ends 10a of the further plates 10 are drawn near one another to form the top edge 9. However, it should be noticed that the first ends 10a are separate and are not fixed to each other.

Again in this embodiment, the plate 2 has the holes 7 for housing respective anchor elements 8 for fixing the plate 2 to the first panel 3.

To allow access to the plate 2 and to allow application of the anchor elements 8, each further plate 10 of the connecting body 4 has a respective "V"-shaped notch 16 made at the top edge 9.

The notches 16, made at the first ends 10a of the further plates 10, are positioned opposite one another to form an opening 17 allowing access to the plate 2.

Moreover, to facilitate access to the plate 2, each further plate 10 of the connecting body 4 has a respective cutout 18 at one lateral edge 10c of the further plates 10.

In detail, the cutouts 18 are created along the opposite lateral edges 10c of the further plates 10. In this way, the working area for access to the plate 2 from the sides of the connecting element 1 advantageously increases, making it easier to fit the anchor elements 8.

With reference to FIG. 5, the plate 2 has four holes 7 aligned in pairs. In other words, the holes 7 are arranged in positions alternately offset relative to a longitudinal axis "A" of the plate 2 (FIG. 5). This feature allows easier access to the holes 7 for fixing the connecting element 1 to the first panel 3.

Advantageously, the connecting element 1 is made by bending a single sheet made of a metal material. The sheet is preferably made of steel.

The invention achieves the preset aims and brings important advantages.

It should be noticed that the specific shape of the connecting body allows the connecting element to achieve good structural features.

The "V"-shaped cross-section of the connecting body noticeably increases its structural rigidity.

This makes the assembly of panels easy, rapid and safe.

Once the connecting body lies in the cavity in the second panel, the latter can at least temporarily maintain its position thanks to the rigidity of the connecting element without having to be immediately fixed in a more stable fashion.

Moreover, in this way, smaller panels can be assembled, making assembly easier and safer.

Another important advantage which should be noticed relates to application of the connecting element in the sector of earthquake-resistant buildings.

The connecting element disclosed features a considerable compromise between rigidity and elasticity.

The shape of the connecting body allows small elastic deformations of the connecting element.

This feature gives the buildings in which it is applied good earthquake-resistant features. Two panels connected using the connecting element which are subjected to strong vibrations can endure relative oscillations which allow the preservation of the structural integrity of the building.

The invention claimed is:

1. A connecting element for connecting a first panel to a second panel, comprising:
   at least one plate which can be fixed to a first panel; a connecting body connected to the at least one plate and which can be inserted into a second panel; said connecting body having a substantially "V"-shaped cross-section and
   presenting a top edge completely insertable into the second panel; means for fixing the connecting body to the second panel;
   wherein the connecting body presents at least one through-hole for housing said means for fixing the connecting body to the second panel;
   wherein the connecting body comprises two further plates, at least one of which is connected to the at least one plate, said two further plates being converging towards the top edge,
   wherein the further plates have respective first ends associated with one another to form the top edge and respective second ends, opposite the first ends, at least one of which is connected to the at least one plate,
   wherein the at least one plate comprises two plates which can be connected to the first panel, each connected to the connecting body; each of the two plates being connected to a respective second end of one of the further plates;
   wherein the two plates lie in such a way that they extend towards one another from the respective second ends of the further plates; and
   wherein each further plate has a respective "V"-shaped notch made at the top edge to allow access to the two plates.

2. The connecting element according to claim 1, characterised in that the through-hole is made through the further plates close to the first ends.

3. The connecting element according to claim 1, characterised in that each of the two plates has at least one hole for housing an anchor element for fixing the two plates to the first panel.

4. The connecting element according to claim 1, characterised in that the first ends of the further plates are connected.

5. The connecting element according to claim 1, characterised in that the first ends of the further plates are drawn near one another.

6. The connecting element according to claim 1, characterised in that the notches are opposite one another.

7. The connecting element according to claim 1, characterised in that each further plate has a respective cutout at least at one lateral edge of each further plate to allow access to the two plates.

8. The connecting element according to claim 7, characterised in that the cutouts are created along opposite lateral edges of each further plate.

9. The connecting element according to claim 1, characterised in that it is made by bending a single sheet.

10. The connecting element according to claim 9, characterised in that the sheet is made of steel.

11. A connecting element for connecting a first panel to a second panel, comprising:
- at least one plate which can be fixed to a first panel; a connecting body connected to the at least one plate and which can be inserted into a second panel; said connecting body having a substantially "V"-shaped cross-section and presenting a top edge completely insertable into the second panel;
- means for fixing the connecting body to the second panel;
- wherein the connecting body presents at least one through hole for housing said means for fixing the connecting body to the second panel;
- wherein the connecting body comprises two further plates, at least one of which is connected to the at least one plate, said two further plates being converging towards the top edge;
- wherein the further plates have respective first ends associated with one another to form the top edge and respective second ends, opposite the first ends, at least one of which is connected to the at least one plate,
- wherein the at least one plate is connected to the second ends of the further plates and lies opposite the top edge, and
- wherein each further plate has a respective "V"-shaped notch made at the top edge to allow access to the at least one plate.

12. A connecting element for connecting a first panel to a second panel, comprising:
- at least one plate which can be fixed to a first panel; a connecting body connected to the at least one plate and which can be inserted into a second panel; said connecting body having a substantially "V"-shaped cross-section and presenting a top edge completely insertable into the second panel;
- means for fixing the connecting body to the second panel;
- wherein the connecting body presents at least one through hole for housing said means for fixing the connecting body to the second panel;
- wherein the connecting body comprises two further plates, at least one of which is connected to the at least one plate, said two further plates being converging towards the top edge,
- wherein the further plates have respective first ends associated with one another to form the top edge and respective second ends, opposite the first ends, at least one of which is connected to the at least one plate, wherein the second ends are spaced apart
- wherein the at least one plate is connected to the second ends of the further plates and lies opposite the top edge, and
- wherein each further plate has a respective cutout at least at one lateral edge of each further plate to allow access to the at least one plate.

* * * * *